United States Patent [19]

Ferrieu

[11] 4,211,896

[45] Jul. 8, 1980

[54] SUBSCRIBER'S CIRCUIT WITH A SYMMETRICAL AMPLIFIER

[75] Inventor: Gilbert M. M. Ferrieu, Bievres, France

[73] Assignee: Telecommunications Radioelectrique et Telephoniques T.R.T., Paris, France

[21] Appl. No.: 949,715

[22] Filed: Oct. 10, 1978

[30] Foreign Application Priority Data

Oct. 17, 1977 [FR] France .................................. 77 31145
Dec. 20, 1977 [FR] France .................................. 77 38404
Jan. 19, 1978 [FR] France .................................. 78 01461

[51] Int. Cl.² .......................................... H04M 3/22
[52] U.S. Cl. .............................. 179/18 FA; 179/84 A
[58] Field of Search ............ 179/18 FA, 18 F, 84 R, 179/84 A, 7 R

[56] References Cited

U.S. PATENT DOCUMENTS

| | | | |
|---|---|---|---|
| 3,808,378 | 4/1974 | Hernandez | 179/84 A |
| 4,065,640 | 12/1977 | Rouiller | 179/7.1 TP |
| 4,132,864 | 1/1979 | Feng | 179/18 FA |

OTHER PUBLICATIONS

"The 12 kcs Call Charge Indicating System", P. Guyer, *Landis & Gyr Review* 19 (1972)2.

*Primary Examiner*—Thomas W. Brown
*Attorney, Agent, or Firm*—Thomas A. Briody; Simon L. Cohen

[57] ABSTRACT

Subscriber's circuit for connecting a subscriber's line to a telephone exchange, comprising a symmetrical amplifier which is arranged between two feed points having different potentials, the amplifier circuit having two input terminals and two output terminals, each one of the output terminals being connected to a wire of the subscriber's line and each input terminal of the symmetrical amplifier circuit being connected to an output of an associated digital-to-analog converter an input of which is connected to the one or to the other feed point by means of a change-over switch, the change-over switches being controlled in phase opposition by a binary digital signal which characterizes a voltage desired for the subscriber's line and which is derived from a digital signal generator under the control of the telephone exchange.

8 Claims, 10 Drawing Figures

SUBSCRIBER'S CIRCUIT WITH A SYMMETRICAL AMPLIFIER

The invention relates to a subscriber's circuit for connecting a subscriber's line to a telephone exchange, comprising a symmetrical amplifier circuit arranged between two feed points having different potentials, the amplifier circuit having two input terminals and two output terminals, each one of the output terminals being connected to a wire of the subscriber's line.

A subscriber's circuit of this type is known from German Offenlegungsschrift No. 2,133,148.

As known, a subscriber's circuit must be capable of applying different voltages to a subscriber's line under the control of the telephone exchange. These voltages are, for example, the ringing voltage having a frequency of, for example, 25 or 50 Hz, d.c. voltage of a given polarity for transmitting dialling information and speech signals and a metering signal having a frequency of, for example, 12kHz. For signalling purposes the subscriber's circuit must also be capable of reversing the polarity of the d.c. voltage on the subscriber's line.

It is an object of the invention to provide a subscriber's circuit of the type defined above, which, using components to be integrated in solid state can perform all the above supply functions in a simple manner.

According to the invention the subscriber's circuit is characterized in that each input terminal of the symmetrical amplifier circuit is connected to an output of an associated digital-to-analog converter, an input of which is connected to the one or to the other feed point by means of a change-over switch, the change-over switches being controlled in phase opposition by a binary digital signal which characterizes a voltage desired for the subscriber's line and which is derived from a digital signal generator under the control of the telephone exchange.

The use of the measures according to the invention provide high symmetrical a.c. voltages for the subscriber's line, a drive to maximum output (to the total supply voltage) being obtained together with the advantages of a completely digital control.

The invention will now be further explained with reference to the accompanying drawing in which.

Figure 1:
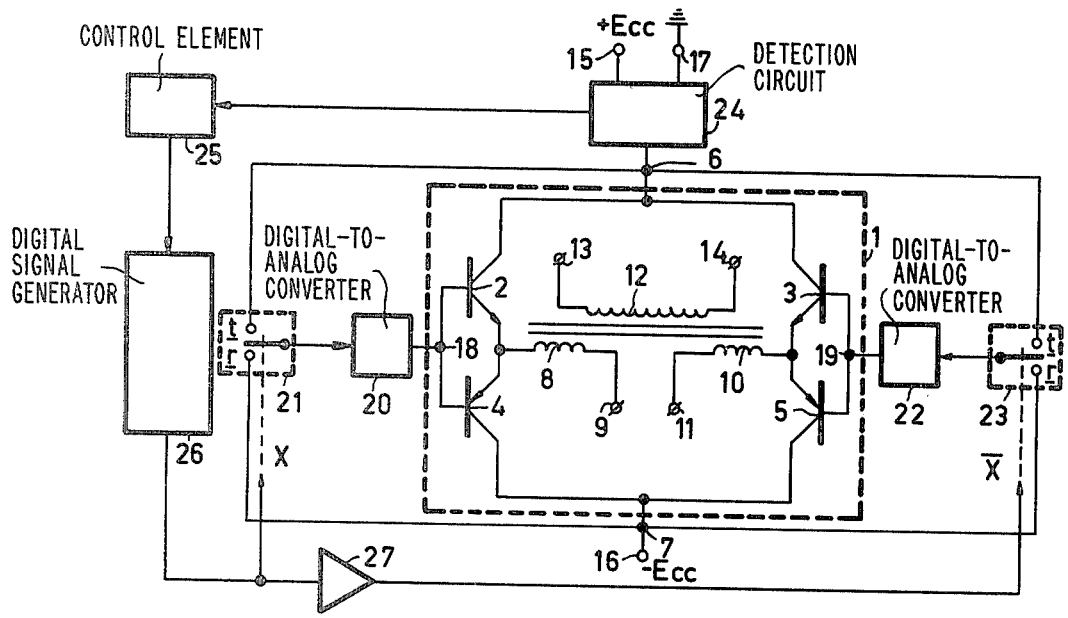
FIG. 1 shows a subscriber's circuit according to the invention.

The subscriber's circuit shown in FIG. 1 comprises a symmetrical amplifier circuit 1 formed by four transistors 2, 3, 4 and 5. The collectors of the npn transistors 2 and 3 are connected to a first feed point 6 and the collectors of the pnp transistors 4 and 5 are connected to a second feed point 7.

The emitters of the transistors 2 and 4 form a first output terminal of the symmetrical amplifier circuit and are connected to a wire 9 of a subscriber's line through a first transformer winding 8, whereas the emitters of the transistors 3 and 5 form a second output terminal connected to the other wire 11 of the subscribers line through a second transformer winding 10. The windings 8 and 10 are identical and are both coupled to a third winding 12 between the ends 13 and 14 whereof a telephone exchange, not shown, is connected.

The potentials of the feed points 6 and 7 are realized by means of a direct current source, not shown in the figure (usually the central battery) which is connected to the terminals 15, 16 and 17, which direct current source provides the potentials +Ecc, −Ecc and zero (ground) respectively. A suitable value for Ecc is 48 volts.

The winding sense of windings 8 and 10 is such that when a d.c. voltage is connected between the terminals, which are not connected to the wires of the subscriber's line, of the windings 8 and 10 the magnetic field produced by the currents in the transformer intensify one another. The direct current impedance of the windings 8 and 10 is low, as is also the impedance of alternating currents having a frequency of 50 Hz, and is further assumed to be negligible.

The interconnected bases of the transistors 2 and 4 form a first input terminal 18 of the symmetrical amplifier circuit 1 and the interconnected bases of the transistors 3 and 5 form the other input terminal 19. Input terminal 18 is connected to an output of a first digital-to-analog converter 20, one input of which can be connected either to feed point 6 or to feed point 7 through a first change-over switch 21. In a similar manner input terminal 19 is connected to an output of a second digital-to-analog converter 22, one input of which can also be connected either to feed point 6 or to feedpoint 7 through a second change-over switch 23. The two change-over switches 21 and 23 are controlled in phase opposition by binary digital signals x and $\bar{x}$, respectively, the change-over switches being in the position t for a signal having the logic level "1" and in the position denoted by r for a signal having the logic level "0".

When the receiver of a telephone set connected to the subscriber's line is on-hook, the subscriber's circuit must, from the moment the telephone exchange produces a call command, apply a ringing voltage to the subscriber's line in the form of a sinusoidal a.c. voltage whose frequency is usually 50 Hz and whose effective amplitude is approximately 60 to 70 volts. The impedance value between the wires 9 and 11 is then the impedance value of the line which is then closed through the bell unit of the subscriber's set. A typical value of said impedance is 3000 Ohm at a frequency of 50 Hz.

If the receiver is lifted from the hook of the subscriber's set the subscriber's circuit must detect closure of the subscriber's loop and must produce a d.c. voltage between the wires 9 and 11, which produces a loop direct current in the subscriber's loop in a normal direction, for example from wire 9 to wire 11. The value of the direct current impedance between the wires 9 and 11 depends on the impedance value of the line. The d.c. voltage to be applied between said wires 9 and 11 is usually approximately 48 volts in order to have a loop current of 30 to 50 mA circulate in the loop. It should be noted that the subscriber's circuit must also make it possible for a loop direct current to flow into the opposite direction. In addition, the subscriber's circuit must be able to produce a metering signal during a conversation which signal is formed by pulse trains having an inaudible frequency of, for example, 12 kHz.

To enable the detection of the state of the subscriber's loop a detection circuit 24 is arranged between the terminals 15 and 17 on the one hand and the feed point 6 on the other hand, which circuit produces an output signal which is representative of the state of the subscriber's loop and which is applied to a control element 25 which is part of the telephone exchange, not shown.

The control element 25 controls a digital signal generator 26 so that a binary digital signal x is produced which characterizes a voltage required for the subscriber's line. As described above, the binary digital signal x controls the change-over switch 21 and, through an inverter 27, the change-over switch 23.

The operation of the digital signal generator 26 will now be described with reference to FIG. 2. The digital signal generator comprises a selection circuit 28 having a control input 29 through which control signals of the control element 25 are received. The selection circuit 28 can occupy one of four positions a, b, c or d and then produces a binary digital output signal x, which characterizes a voltage required for the subscriber's line, at an output 30. In position a the signal x is formed by a pulse train which is produced by means of an analog-to-digital converter 31 and which is an encoded version of a sinusoidal signal having a frequency of, for example, 12 kHz, applied to an input of the A/D converter 31. In position b the signal x is formed by a signal having the constant logic value "1", which is denoted in the figure by a circuit 32 which passes a positive d.c. voltage as a signal having the level "1". By means of a circuit 33 a negative d.c. voltage is converted into a signal having the logic level "0", which is passed on as signal x to the output 30 when the selection switch 28 is in position c. Finally, in position d the signal x consists of a pulse train which is formed by means of an A/D converter 34 from a sinusoidal signal having a frequency of, for example 50 Hz.

The A/D converters 31 and 34 may, for example, be implemented as delta modulators but, alternatively, they can be arranged so that a pulse width—modulated signal or a pulse width and pulse position—modulated signal is produced.

It is of course obvious that, since only the production of digital versions of sinusoidal signals having a given fixed frequency or of d.c. voltage signals is involved here it is alternatively possible to store the required values in a store which can then be read at suitable moments.

To explain the operation of the above-described subscribers circuit the case in which the detection circuit 24 detects only the closing of the subscriber's loop will now be considered first. The following description relates to a simple circuit 24 which measures the current produced between the terminal 15 and the feed point 6 and which applies a signal which indicates opening or closing of the loop, depending on whether said current is smaller or greater than a predetermined threshold current, to the control element 25. Such a detection circuit is implemented so that it results in a small voltage drop relative to the voltage Ecc, thus that in the considered case the potential of the feed point 6 will always be substantially equal to +Ecc.

The various operation modes of the subscriber's circuit according to the invention will now be described, the circumstances being as described above.

When the control element 25 produces a control signal for calling a subscriber, a signal X which characterizes a ringing voltage having a frequency of 50 Hz is produced at the output of the digital signal generator 26. Said signal X is applied to the change-over switch 21 and the reconstructed sinusoidal signal having a frequency of 50 Hz is produced at the output of the digital-to-analog converter 20. As the terminals t and r of the change-over switch 21 have the potentials +Ecc and —Ecc, respectively, it is obvious that at the output of the D/A converter 20 a substantially sinusoidal signal having a frequency of 50 Hz is obtained which is symmetrical with respect to ground and which has an amplitude Ecc as indicated by curve A of FIG. 3. Because the change-over switch 23 is controlled by the Signal $\overline{X}$, which is the complement of the signal X, a signal having the same shape as the signal produced by the D/A converter 20, but whose phase is shifted 180°, as indicated by curve A' of FIG. 3, will be produced at the output of the D/A converter 22.

These two signals, which are represented by the curves A and A' control in the manner described below the symmetrical amplifier circuit 1 formed by the four transistors 2, 3, 4 and 5. When the signal A is positive and consequently the signal A' is negative, it will be obvious that through the bell unit of the subscriber's set a current will flow from wire 9 to wire 11 through the conducting transistors 2 and 5, the transistors 3 and 4 then being in the non-conducting state. When the signal A is negative and, consequently, the signal A' is positive the current flows through the bell unit of the subscriber's set in the opposite direction through the conducting transistors 3 and 4, the transistors 2 and 5 then being in the non-conducting state. As the load is connected to the emitter electrodes of the transistors 2 to 5 it will be clear that, ignoring the voltage drop (approximately 1 volt) in the emitter collector path of two of the said transistors, the signal applied to the wires 9 and 11 of this subscriber's line is substantially sinusoidal and symmetrical with respect to earth, having an amplitude 2 Ecc as denoted by curve B of FIG. 2.

If Ecc=48 volts a signal having a frequency of 50 Hz, its amplitude being 96 volts, suitable for use as the ringing signal, is obtained on the wires 9 and 11 of the subscriber's line. If, for example, the impedance value of the line, which is closed through the bell unit is approximately 5000 Ohm, the amplitude of the current circulating in the subscribers line is approximately 19mA.

In normal operation, the receiver being onhook and outside the ringing intervals, the digital signal generator 26 is controlled by the control element 25 so that the signal X at the output of the digital signal generator 26 has the level "1". The change-over switches 21 and 23 are then in the positions t and r, respectively, the potentials +Ecc and —Ecc, respectively, then occurring at the outputs of the D/A converters 20 and 22. As the subscriber's loop is the open for d.c. current no current flows through the emitter-collector path of the transistors 2 to 5. When the subscriber lifts the receiver from the hook the subscriber's loop is closed and has a relatively low direct current impedance. A direct current then flows in the loop from the wire 9 to the wire 11 through the transistors 2 and 5 which are then in the conducting state. When the small voltage drop in the emitter-collector path of those transistors is ignored, it is clear that the voltage between the wires of the subscribers line has the value 2 Ecc, that is to say 96 volts when Ecc=48 volts. Such a supply voltage can be used for having the normal current circulate in the subscriber's loop in the case of relatively long lines. When, for example, the impedance value of the subscriber's loop is 2000 Ohm, a 48 mA current will circulate in the loop, which is a suitable value. This current flows through the detection circuit 24 which, if a predetermined threshold is exceeded, informs the control element 25 that the subscriber's loop is closed.

It should be noted that during the ringing periods, the receiver being on-hook, the ringing current always flows in the same direction through the detection circuit 24. Owing to the high ratio which normally exists between the loop direct current and the maximum ringing current it is possible to select an intermediate threshold in the detection circuit 24 so that the detection circuit is made completely insensitive to the ringing current.

Figure 3:
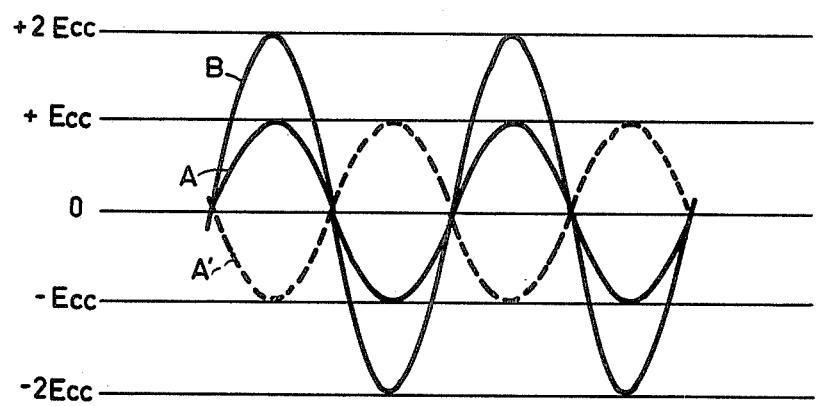
FIG. 3 shows a diagram of the signal produced at the output of the digital-to-analog converters during ringing.

When, during a call, the subscriber lifts the receiver from the hook the closing of the loop is almost immediately detected by the detection circuit 24. Namely, as described above, a sinusoidal voltage having a frequency of 50 Hz and whose amplitude is approximately 2 Ecc (for example 96 volts) as represented by curve B of FIG. 3, is produced between the wires 9 and 11 of the subscriber's loop during a call. When the receiver is lifted from the hook a variable current flows in the subscriber's loop as a result of this voltage, the amplitude of this variable current becoming equal to the amplitude of the loop direct current in a period of time which is smaller than half a cycle of the ringing signal. So it is clear that during a still shorter time interval the closing of the subscriber's loop is detected by the detection circuit 24, which operates in the manner described above.

Finally, the above description will make it clear that if the direction of the direct current must be inverted it is sufficient to have the digital signal generator 26 produce a signal X=0 under the control of the control element 25. A current will then flow in the subscriber's loop from wire 11 to wire 9 through the transistors 3 and 4, which are then in the conducting state.

Figure 2:
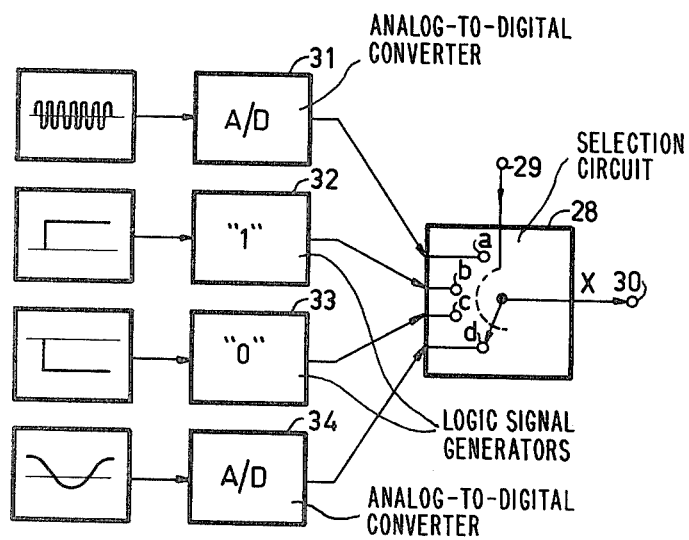
FIG. 2 shows a digital signal generator for use in the subscriber's circuit shown in FIG. 1.

When the selection switch 28 of FIG. 2 is in the position a, a metering signal is applied to the subscriber's line. As known, a metering signal is formed by means of pulse trains having an inaudible frequency which are transmitted during the conversation in a rhythm determined by the telephone exchange. The duration of each pulse train is, for example, half a second and the frequency of the pulses to be transmitted is, for example, 12 kHz. The amplitude of these pulses is approximately 2 volts. The transmitted pulse trains are detected in the subscriber's set and can be used to make a pulse counter operative, which counter constitutes a cost indicator at the subscriber's end.

The metering signal can be transmitted in the following manner. Under the control of control element 25 the selection switch 28 is adjusted to the position a for the duration of each pulse train. The digital signal generator 26 then supplies a two-level periodic signal, which is produced by delta encoding a sinusoidal signal having the same frequency as the pulses of the pulse trains of the metering signals. When the change-over switches 21 and 23 are controlled by the signal X and the complementary signal $\overline{X}$, respectively, an amplitude-modulated signal is obtained, as will be described hereinafter, between the wires 9 and 11 of the subscriber's line, the modulation frequency being equal to the frequency of the metering signal pulses, whereas the modulation amplitude can be made equal to the amplitude required for the pulses of said metering signal.

Figure 4:
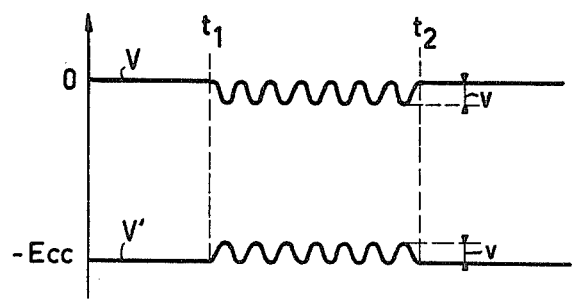
FIG. 4 shows a diagram of the variation of a first possible metering signal at the output of the digital-to-analog converters.
Figure 5:
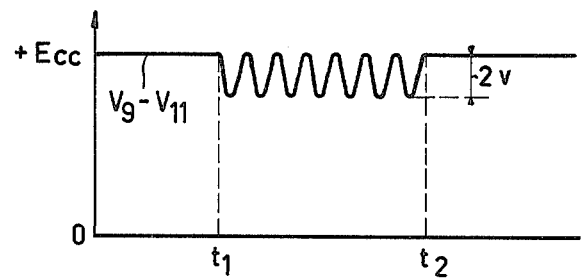
FIG. 5 shows the metering signal on the subscriber's line during a variation as shown in FIG. 4.

Now follows a detailed explanation of the operation of the subscriber's circuit as regards the transmission of the metering signal, reference being had to the FIGS. 4 to 7 inclusive. In FIG. 4 the curves V and V' show the variation of the potentials at the output of the D/A converters 20 and 22, respectively, whereas FIG. 5 shows the variation of the potential difference $V_9-V_{11}$ between the wires 9 and 11 of the subscriber's line.

When the subscriber's loop is closed and outside the period of time occupied by the pulse trains of the metering signal, the selection switch 28 is in the position b, so that the signal X has the value "1", whereas the change-over switches 21 and 23 are in the position $\underline{t}$ and $\underline{r}$ respectively, so that the potentials V and V' at the outputs of the D/A converters 20 and 22 are equal to the zero potential of the feed point 6 and the potential $-$Ecc of feed point 7, respectively. This is shown in FIG. 4 by a time interval prior to instant $t_1$ and for a time interval after the instant $t_2$. The potentials $V_9$ and $V_{11}$ of the wires 9 and 11 of the subscriber's line approach the potentials V and V' relatively closely and for simplicity it is assumed that said potentials $V_9$ and $V_{11}$ are equal to the zero potential and $-$Ecc potential, respectively, outside the period of time occupied by the pulse trains of the metering signal. As indicated in FIG. 5 the potential difference $V_9-V_{11}$ is equal to $+$Ecc prior to instant $t_1$ and after the instant $t_2$.

When during the time interval limited by the instants $t_1$ and $t_2$ the selection switch 28 is adjusted to the position a, the change-over switches 21 and 23 are controlled by the signals X and $\overline{X}$, respectively, which characterize the metering signal. As denoted by the curve V of FIG. 4 the potential at the output of the D/A converter 20 which was equal to zero prior to instant $t_1$ is now amplitude-modulated in said interval between $t_1$ and $t_2$ by a sinusoidal signal having a frequency of 12 kHz and an amplitude v. It is obvious that the potential V cannot exceed the value zero and, consequently, varies between O and V in the time interval from $t_1$ to $t_2$. As indicated by the curve V' of FIG. 4 the potential at the output of the D/A converter 22 which was equal to $-$Ecc prior to instant $t_1$ is now amplitude-modulated in the same manner in the time interval from $t_1$ to $t_2$, the modulation frequency being equal to 12 kHz and the modulation amplitude being v. The potential V' varies between $-$Ecc and $-$Ecc$+$v between the instants $t_1$ and $t_2$. It is obvious that the potentials V and V' vary in phase opposition. As it was assumed, for simplicity that the potentials $V_9$ and $V_{11}$ of the wires 9 and 11 of the subscriber's loop are equal to the potentials V and V' it can be easily deduced that the potential difference $V_9-V_{11}$ between the instants $T_1$ and $t_2$ varies as shown in FIG. 5 and therefore corresponds to a pulse train of the metering signal. Between $+$Ecc and $+$Ecc$+$v said potential difference varies approximately sinusoidally with the required frequency of 12 kHz.

The voltage Ecc for feeding the subscriber's line is, for example, 48 volts and the amplitude 2v of the variations in said voltage can be adjusted to the required value of approximately 2 volts.

Figure 6:
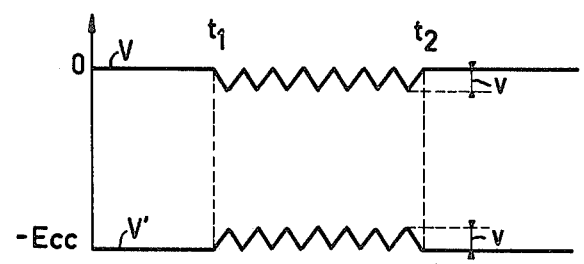
FIG. 6 shows a diagram of the variation of a second possible metering signal at the output of the digital-to-analog converters.
Figure 7:
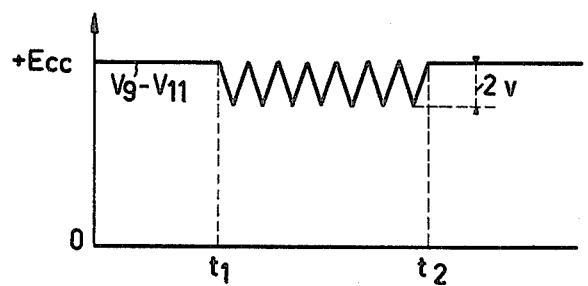
FIG. 7 shows the metering signal on the subscriber's line at a variation as shown in FIG. 6.

It will be clear for one skilled in the art that it is possible to transmit pulses with the required frequency of, for example 12 kHz at a small number of harmonics when a value which is relatively high with respect to the frequency 12 kHz (for example 50 kHz to 100 kHz) is chosen as the frequency of the bits in the signal X. If harmonics of the 12 kHz frequency of the pulses of the metering signal can be accepted to a certain degree, a pulse shaped signal having a frequency of 12 kHz can be used as the control signal for the change-over switches 21 and 23, instead of a binary digital signal having a frequency of 50 kHz to 100 kHz. The digital-to-analog converters 20 and 22 can then be implemented as simple RC-networks having a suitable time constant so that the potentials V and V' occurring in the time interval $t_1$ to $t_2$ at the outputs of D/A converters 20 and 22 will vary in accordance with a sawtooth curve having a frequency of 12 kHz and an amplitude v, as shown in FIG. 6. Between the wires 9 and 11 of the subscriber's line this results in the potential difference $V_9-V_{11}$ whose variation is shown in FIG. 7 and which corresponds in the time interval from $t_1$ to $t_2$ to a sawtooth curve having a frequency of 12 kHz and an amplitude 2v which, as mentioned above, can be adjusted to the required value of approximately 2 volts. If a certain degree of harmonics of the fundamental frequency 12 kHz on the subscribers line can be tolerated said sawtooth pulses can be used without additional measures for forming the pulse trains of the metering signal. Finally, it is clear that the pulses to be produced on the subscriber's line for the transmission of the metering signal need not of necessity have the sawtooth shape with a constant slope as shown in FIG. 7. The sole requirement is that the fundamental frequency of said pulses be equal to the frequency required for the metering signal having the required amplitude.

Figure 8:
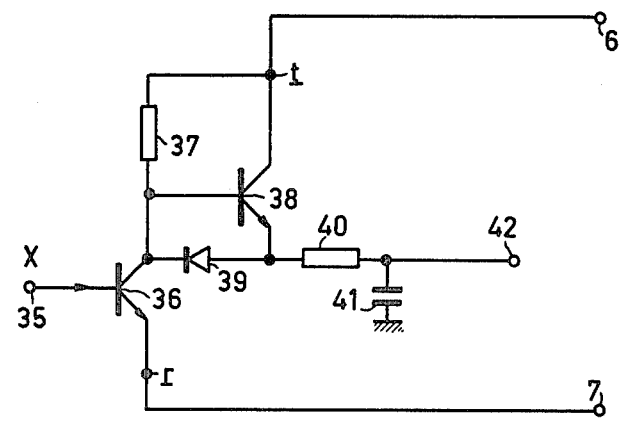
FIG. 8 shows an embodiment of a change-over switch and a digital-to-analog converter for use in a subscriber's circuit as shown in FIG. 1.

The embodiment, shown in FIG. 8, of a changeover switch and a digital-to-analog converter comprises an input terminal 35 to which the signal X of the digital signal generator 26 of FIG. 1 is applied. The terminal t of the change-over switch is connected to the feedpoint 6 which has a potential −Ecc, the terminal r being connected to the feedpoint 7 having a potential +Ecc or zero potential, as explained earlier in this description. The change-over switch comprises a npn transistor 36 which has its base electrode connected to the input terminal 35, the emitter electrode to the terminal r and the collector electrode to the terminal t through a resistor 37. The collector of transistor 36 is further connected to the base electrode of an npn transistor 38, and, through a diode 39, to the emitter electrode of transistor 38. The collector electrode of transistor 38 is connected to the terminal t whereas the emitter electrode of said transistor 38 is connected to a resistor 40 of a digital-to-analog converter which comprises the resistor 40 and a capacitor 41. The junction of the resistor 40 and the capacitor 41 constitutes the output 42 of the D/A converter.

When the logic signal X obtains a value (for example "0") the transistor 36 becomes saturated so that the diode 39 conducts and transistor 38 is in the non-conducting state. The capacitor 41 is then charged by a current flowing through the resistor 40, the conducting diode 39 and the emitter-collector path of transistor 36 to feed point 7. When the logic signal X assumes a value (for example "1") which causes the transistor 36 to become non-conducting, the diode 39 is in the non-conducting state, the transistor 38 becomes conductive and the capacitor 41 is charged by a current flowing through the resistor 40 and the emitter-collector path of transistor 38. The time constant of the RC network is such that when the input signal X characterizes a ringing voltage, a substantially sinusoidal voltage is obtained between the output 42 and ground, which voltage is symmetrical with respect to earth and has a frequency of 50 Hz and an amplitude Ecc. When the input signal X has permanently the value "0", a d.c. voltage which is approximately equal to −Ecc is produced at the output 42 with respect to ground. When the signal X has permanently the value "1", a d.c. voltage which is approximately equal to +Ecc when the subscriber's loop is open and approximately equal to "0" when the subscriber's loop is closed is produced at the output 42. It should be noted that when the subscriber's set is idle (open subscriber's loop) the energy consumption of the circuit shown in FIG. 8 is very low. The transistor 36 is cutoff by the signal X=1 and the transistor 38 should not produce any current as the output 42 is not connected. The energy consumption of the other circuit in which transistor 36 is conductive in response to the signal $\overline{X}=0$ is determined by the ohmic value of the resistor 37 and said ohmic value can be very high when the gain coefficient of transistor 38 is high.

Figure 9:
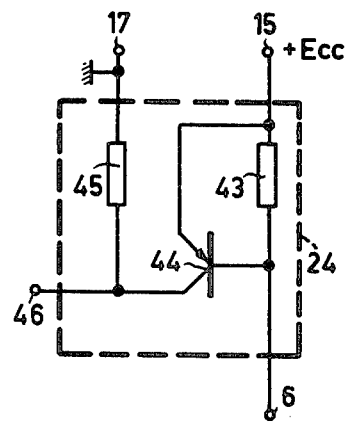
FIG. 9 shows a first embodiment of a detection circuit for use in a subscriber's circuit as shown in FIG. 1.

FIG. 9 shows a simple embodiment of a detection circuit 24. This detection circuit comprises a resistor 43 arranged between terminal 15 (potential +Ecc) and feed point 6 and a pnp transistor 44 which has its base electrode and its emitter electrode connected to the terminals of the resistors 43 and the collector electrode to the terminal 17 (ground) through the resistor 45. When the current flowing between terminal 15 and the feed point 6 attains a threshold which is determined by the resistor 43, the voltage drop in said resistor 43 becomes sufficient to render transistor 44 conductive, so that it is possible to produce a detection signal at an output 46, which is connected to the collector electrode of this transistor 44. The voltage drop in the resistor 43 is limited to the emitter-base diode voltage of the transistor 43 (approximately 0.7 volt) so that the potential of feed point 6 is always approximately equal to +Ecc.

For telephone lines of a normal length it is usually sufficient to apply a d.c. voltage of approximately 48 volts between the wires 9 and 11 of the subscriber's loop and to have a normal direct current circulate therein. In the embodiment, shown in FIG. 10, of a detection circuit 24 it is possible to obtain such a result and to retain the same values as previously with respect to the ringing signal and the d.c. voltage for detecting the closure of the loop. According to this embodiment the device 24 has a dual function, namely, in addition to detecting the closure of the subscriber's loop it must also reduce the potential of the feed point 6 from the positive value +Ecc to a value of approximately zero at the instand at which the subscriber's loop is closed.

The circuit diagram of FIG. 1 still holds for a detection circuit 24 implemented in this manner. The subscriber's circuit functions as described above when the subscriber's loop is open (receiver on-hook) and particularly during the time intervals for the ringing signal because then the potentials of feed points 6 and 7 are approximately +Ecc and −Ecc, respectively. At the moment at which the receiver is lifted from the hook the detection circuit 24 detects the closing of the subsriber's loop which is fed by a voltage 2 Ecc and thereafter adjusts the potential of feed point 6 to a value which is approximately equal to zero. The current then circulating in the subscriber's loop through the transistors 2 and 5, which are then conductive, is determined by the potential difference of approximately Ecc (for example 48 volts) between the feed points 6 and 7.

Figure 10:
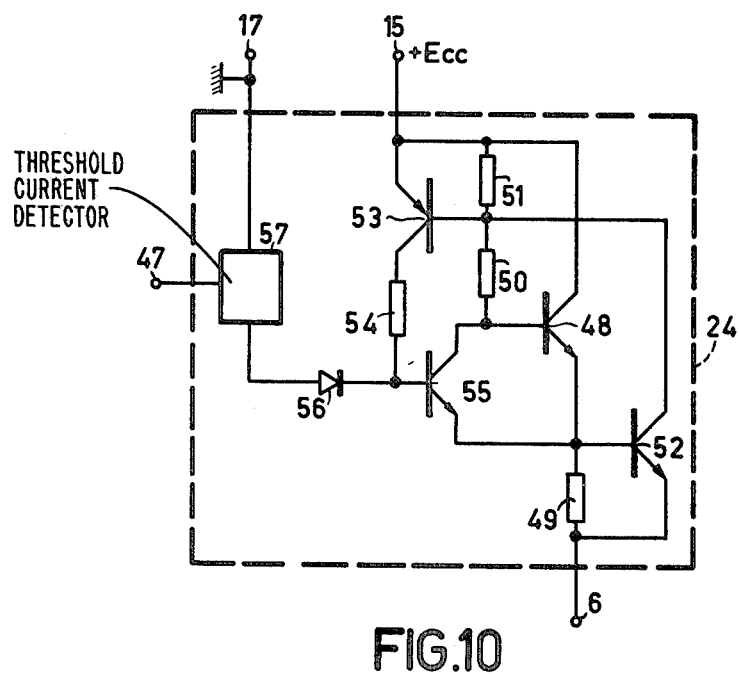
FIG. 10 shows a second embodiment of a detection circuit for use in a subscriber's circuit as shown in FIG. 1.

FIG. 10 shows an embodiment of the detection circuit 24 in which, as in FIG. 1, the terminals 15 and 17 and the feed point 6 are shown. The output 47 of the detection circuit 24 is connected to an input of the control element 25. The detection circuit 24 comprises a npn transistor 48 which has its collector connected to the terminal 15. The emitter of said transistor 48 is connected to the feed point 6 through a resistor 49, the base also being connected to the terminal 15 through the series arrangement of two resistors 50 and 51. The base electrode and the emitter electrode of a npn transistor 52 are connected to the ends of the resistor 49 whereas the collector electrode of this transistor 52 is connected to the junction of the resistors 50 and 51. The base electrode of a pnp transistor 53 is also connected to this junction, whereas the emitter electrode of this transistor 53 is connected to the terminal 15 and the collector electrode is connected to the base electrode of a npn transistor 55 through a resistor 54. The collector electrode of the transistor 55 is connected to the base electrode of transistor 48. The emitter electrode of transistor 55 is connected to the base electrode of transistor 55 and is connected to terminal 17 through a diode 56 and a circuit 57 for measuring and detecting a threshold current.

The detection circuit 24 of FIG. 10 operates as follows. When the subscribers circuit which, in FIG. 1, is included between the feed points 6 and 7 conducts a relatively low current from terminal 15 with potential +Ecc, said low current which produces a voltage drop in the resistor 49, which is insufficient to render transistor 52 conductive, flows through the emitter-collector path of transistor 48 whose base electrode is biased by the series-arranged resistors 50 and 51. In response thereto the other transistors 53 and 55 and also the diode 56 are cutoff. The relatively weak current mentioned above is the current which is taken off whenever the subscriber's loop is open (receiver on-hook), particularly during the time intervals of the ringing signal. The elements of the detection circuit 24 are chosen so that the feed point 6 remains at a potential of approximately +Ecc (+48 volts). On the other hand the circuit 57, in which no current flows, informs the telephone exchange that the loop is open.

When the subscribers loop is closed (receiver off-hook) the current through the resistor 49 reaches a threshold value above which the voltage drop across the resistor 49 is sufficient to render transistor 52 conductive. The collector current of transistor 52 produces a voltage drop across resistor 51 which renders the transistor 53 conductive and, consequently, also the transistor 55. The collector current of transistor 55 through the resistors 50 and 51 results in an increase in the current through the transistors 53 and 55 and in a decrease of the current through the transistor 48. At the end of this cumulative process transistor 48 is cutoff, the transistors 53 and 55 are saturated and the voltage drop across the elements between the terminal 15 and the base electrode of the transistor 55 is such that the diode 56 starts to conduct even when the current then flowing through resistor 49 (and which comes from the terminal 17 through the circuit 57, the diode 56 and the base-emitter diode of transistor 55) is sufficient to keep the transistor 52 in the conducting state. The potential of the feed point 6 becomes somewhat lower than the potential of the terminal 17, the difference (a few volts) being formed by the sum of the voltages across the elements 57, 56, 55 and 49. In that manner the subscriber's loop is fed by a voltage which is approximately +Ecc (48 volts). The circuit 57 indicates the closing of the subscriber's loop if the diode 56 becomes conductive but it should be noted that the equilibrium in the circuit is effected in the first place by a current in the subscriber's loop which is fed by a voltage 2 Ecc (96 volts) which contributes in all circumstances to a very reliable detection of the closing of the loop.

What is claimed is:

1. A subscriber's circuit for connecting a subscriber's line to a telephone exchange, comprising a symmetrical amplifier circuit arranged between two feed points having different potentials, the amplifier circuit having two input terminals and two output terminals, each one of the output terminals being connected to a wire of the subscriber's line, separate digital-to-analog converters having outputs connected to each input terminal of the symmetrical amplifier circuit, separate change-over switches connecting an input of each digital-to-analog converter to the one or to the other feed point, the change-over switches being controlled in phase opposition by a binary digital signal which characterizes a voltage desired for the subscriber's line, and a digital signal generator under the control of the telephone exchange providing said binary digital signal.

2. A subscriber's circuit as claimed in claim 1, characterized in that said digital signal generator comprises means for encoding sinusoidal signals by means of delta modulation.

3. A subscriber's circuit as claimed in claim 1, characterized in that said digital signal generator comprises means for encoding sinusoidal signals either by means of pulse-width modulation or by means of pulse-width and pulse-position modulation.

4. A subscriber's circuit as claimed in claim 1, characterized in that for transmitting a metering signal the change-over switches are controlled so that at the output of each digital-to-analog converter a signal is produced whose amplitude is modulated with a modulation frequency which is equal to the frequency required for the pulses of the metering signal and with a modulation amplitude equal to the amplitude required for those pulses.

5. A subscriber's circuit as claimed in claim 1, characterized in that in the case of an open subscriber's loop the potential difference between the two feed points is approximately equal to twice the potential at one of the feed points, each digital-to-analog converter comprising means for producing during the ringing phase a sinusoidal voltage which is symmetrical with respect to ground and which has an amplitude which is substantially equal to the potential at said one of the feed points, so that a sinusoidal ringing voltage whose amplitude is approximately twice said potential at said one of the feed points is produced between the output terminals of the symmetrical amplifier circuit.

6. A subscriber's circuit as claimed in claim 1, characterized in that in the case of an open loop and outside the ringing phase each digital-to-analog converter comprising means for producing a d.c. voltage which is substantially equal to the difference potentials at the feed points so that a d.c. voltage having an amplitude equal to the potential difference between feed points is produced between the output terminals of the symmetrical amplifier circuit.

7. A subscriber's circuit as claimed in claim 5 or 6, characterized in that a detection circuit which is coupled to one of the feed points is provided for detecting whether the current through said detection circuit attains a certain threshold value which corresponds to the closing of the subscriber's loop, said detection circuit being arranged so that in the case of a closed subscriber's loop the potential difference between the two feed points remains substantially equal to twice the potential at either feed point and the symmetrical amplifier circuit applies a d.c. voltage, whose amplitude is approximately twice the potential at either feed point and the symmetrical amplifier circuit applies a d.c. voltage whose amplitude is approximately twice the potential at either feed point to the subscriber's line.

8. A subscriber's circuit as claimed in claim 5 or 6, characterized in that a detection circuit which is coupled to one of the feed points is provided for detecting whether the current through said detection circuit exceeds a given threshold which corresponds to the closing of the subscriber's loop, said detection circuit being arranged so that it functions as a flip-flop circuit when the threshold is exceeded in order to connect the feed point to ground, so that in the case of a closed subscriber's loop the potential difference between the two feed points is substantially equal to the potential at the non-grounded feed point and the symmetrical amplifier circuit applies a d.c. voltage whose amplitude is substantially the potential at the non-grounded feed point to the subscriber's line.

* * * * *